(12) United States Patent
Andre Poyaud et al.

(10) Patent No.: US 9,997,263 B2
(45) Date of Patent: Jun. 12, 2018

(54) METHOD OF DETERMINING THE VALUE OF A PARAMETER REPRESENTATIVE OF THE OPERABILITY OF A NUCLEAR REACTOR, DETERMINING SYSTEM, COMPUTER AND CORRESPONDING MEDIUM

(75) Inventors: Gilles Andre Poyaud, Lyons (FR); Bruno Julien, Lyons (FR); Jean-Lucien Mourlevat, Noisy le Roi (FR)

(73) Assignee: AREVA NP, Courbevoie (FR)

( * ) Notice: Subject to any disclaimer, the term of this patent is extended or adjusted under 35 U.S.C. 154(b) by 1235 days.

(21) Appl. No.: 12/745,863

(22) PCT Filed: Nov. 21, 2008

(86) PCT No.: PCT/FR2008/052104
§ 371 (c)(1),
(2), (4) Date: Jun. 2, 2010

(87) PCT Pub. No.: WO2009/071817
PCT Pub. Date: Jun. 11, 2009

(65) Prior Publication Data
US 2010/0260300 A1    Oct. 14, 2010

(30) Foreign Application Priority Data
Dec. 7, 2007    (FR) ...................... 07 59643

(51) Int. Cl.
*G21C 17/00*    (2006.01)
*G21D 3/00*    (2006.01)

(52) U.S. Cl.
CPC ............. *G21C 17/00* (2013.01); *G21D 3/001* (2013.01); *G21Y 2002/201* (2013.01);
(Continued)

(58) Field of Classification Search
USPC ......................................... 376/245
See application file for complete search history.

(56) References Cited

U.S. PATENT DOCUMENTS 4,774,049 A * 9/1988 Impink et al. ................ 376/245
2006/0129362 A1   6/2006 Mahe et al.

FOREIGN PATENT DOCUMENTS

EP    0405863    1/1991
EP    1113455    7/2001
(Continued)

*Primary Examiner* — Frank J McGue
(74) *Attorney, Agent, or Firm* — Davidson, Davidson & Kappel, LLC

(57) ABSTRACT

A method involving periodic implementation, during the same operating cycle of the reactor, the method including following steps of: a) calculating, from measurements provided by sensors present in the reactor, the three-dimensional distribution of the local power in the core, b) simulating at least one accidental transient occurrence of power applied to the calculated three-dimensional distribution of local power, c) identifying, using thermomechanical calculations, at least one rod which is the most likely to be subject to a fracture of the cladding thereof during the simulated transient occurrence of power, and d) determining, using thermomechanical calculations on the rod identified, the value of the parameter which is representative of the operability of the reactor.

3 Claims, 4 Drawing Sheets

(52) U.S. Cl.
CPC .. *G21Y 2002/203* (2013.01); *G21Y 2002/304* (2013.01); *G21Y 2004/40* (2013.01); *Y02E 30/40* (2013.01)

(56) References Cited

FOREIGN PATENT DOCUMENTS

| | | |
|---|---|---|
| EP | 1221701 | 7/2002 |
| FR | 2846139 | 4/2004 |

* cited by examiner

METHOD OF DETERMINING THE VALUE OF A PARAMETER REPRESENTATIVE OF THE OPERABILITY OF A NUCLEAR REACTOR, DETERMINING SYSTEM, COMPUTER AND CORRESPONDING MEDIUM

The present invention relates to a method for determining the value of a parameter representative of the operability of a nuclear reactor.

BACKGROUND

The invention is used, for example, in pressurised water reactors.

In conventional manner, the core of such a reactor is charged with nuclear fuel assemblies.

Each assembly comprises a bundle of nuclear fuel rods, the rods comprising a cladding which contains nuclear fuel pellets.

It may be advantageous, particularly in countries such as France where 80% of electricity is produced by nuclear reactors, for the overall power supplied by the reactors to vary in order to adapt to the requirements of the electrical power network which they supply.

In particular, it is desirable to be able to operate reactors with reduced overall power for a long period of time when the demand on the network is low, before returning if necessary to nominal overall power.

Nonetheless, operating each reactor in this manner, which allows the capacities thereof to be better exploited, must not involve safety problems.

One of the phenomena limiting the operability of nuclear rectors is in particular the phenomenon of Pellet/Cladding Interaction (PCI).

When the reactor operates at the nominal overall power PN thereof, the nuclear fuel rods are, according to the term used in the art, processed.

For a specific rod, the processing is characterised substantially by the radial clearance being closed between the pellets and the cladding, owing to the creep of the cladding and the swelling of the pellets.

Although there is no risk of fracture of the cladding during permanent operation owing to the thermomechanical equilibrium in the cladding at relatively low stress levels, a risk does arise as soon as the power provided by the rod in question varies significantly.

An increase of local power brings about an increase of the temperature in the rod. Given the difference of the mechanical characteristics (thermal expansion coefficient, Young's modulus) and the temperature difference between the pellet based on uranium oxide and the cladding which is conventionally of zirconium alloy, the pellet will expand more than the cladding and impose its deformation on the cladding.

Furthermore, the presence in the space between the cladding and the pellet of corrosive fission products, such as iodine, creates corrosion conditions under stress. In this manner, the deformation imposed by the pellet on the cladding during a transient occurrence of overall power may bring about a fracture of the cladding.

Such a fracture of the cladding is not admissible for safety reasons since it could result in fission products being released into the coolant system of the nuclear reactor.

The patent application EP-1 556 870 describes a method which, using the phenomenon of PCI, allows the limit values of the operating parameters of a nuclear reactor to be determined. More precisely, the limit values determined are such that, in the event of an accidental transient occurrence of overall power which will become evident with an increase in the local power in the entire core, the phenomenon of PCI will not result in a fracture of the nuclear fuel rod cladding.

This method thus allows the fields of use to be defined in which the nuclear reactor can operate in a safe manner, even in the event of an accidental transient occurrence of overall power. Alarms can also be introduced to verify that the limit values determined are not exceeded during the operation of the nuclear reactor.

The PCI phenomenon is particularly disadvantageous with respect to a specific operating method of nuclear reactors. This is Extended Reduced Power Operation (ERPO).

In France, extended reduced power operation is more precisely defined as being the permanent operation of the reactor, at an overall power PI less than or equal to, for example, approximately 92% of the nominal power PN thereof, for example, over a cumulative period of time of more than 8 hours in a given 24 hour period.

Such a method of operation has the effect of de-processing the rods.

During a reduction of the overall power, the power decreases locally. There is consequently a temperature reduction in the pellets and in the cladding of each rod, which brings about a reduction of the thermal expansions of these elements. Since each pellet has a greater thermal expansion coefficient than that of the associated cladding, it therefore retrocedes a greater absolute expansion.

This is further amplified by the fact that, for a specific local power reduction, the temperature variation in each pellet is greater than that in the cladding.

In this manner, during operation in ERPO mode, for the rods in which the contact between the cladding and the pellets is not established, the radial clearance increases. With regard to the rods in which the clearance was closed, the clearance re-opens.

In the event of reopening of the clearance, there is creeping in terms of compression towards the inner side of the cladding owing to the effect of pressure. The stresses which appear in the cladding in the event of an accidental transient occurrence of power during operation in ERPO mode thus reach greater values than if the transient occurrence takes place when the reactor is operating at nominal overall power.

The risks of a fracture owing to the PCI phenomenon are therefore increased when the reactor operates in ERPO mode.

In order to allow nuclear reactor operators to evaluate the extent to which they are able to use ERPO mode, without compromising the integrity of the claddings of the rods, a parameter has been developed, the credit K.

This parameter which is representative of the operability of the nuclear reactor is defined by the formula:

$$K = K_0 - \sum_i A_i T_i + \sum_j B_j T_j$$

where $K_0$ is the initial value of the credit K;

$A_i$ is a deprocessing coefficient calculated from the laws of deprocessing;

$T_i$ is the duration of a phase i of use of the ERPO mode;

$B_j$ is a reprocessing coefficient calculated from the reprocessing laws; and $T_j$ is the duration of a phase j of nominal overall power operation after a period of operation in ERPO mode.

The operator is capable using this formula of calculating the development during a cycle of the value of the credit K in accordance with the successive phases of operation in ERPO mode and at nominal overall power.

The lower the value of the credit K is, the less possibility there is for the operator to use ERPO mode. When the value of the credit K is 0, the operator can no longer function in ERPO mode and must only operate the reactor at nominal power or shut it down.

In order to increase the value of the credit K, the operator may choose to operate the reactor at nominal overall power for a specific length of time.

The establishment of this formula, and in particular that of the coefficients $A_i$ and $B_j$ which takes almost two years, requires very significant calculations which are carried out over a period of several months on processors operating in parallel.

Taking into account the complexity involved in calculating the coefficients $A_i$ and $B_j$, the determination of the value of the credit K is carried out in a generic manner for a specific reactor, fuel assembly and control which requires the introduction of a number of careful considerations.

Although the use of the credit K allows safe operation to be ensured for the nuclear reactor, unfortunately it therefore leads to limited operability.

SUMMARY OF THE INVENTION

An object of the invention is to solve this problem by providing a method which is for determining the value of a parameter representative of the operability of a nuclear reactor core and which allows the operability of the reactor to be increased whilst ensuring safe operation.

To this end, the invention provides a method of determining the value of a parameter representative of the operability of a nuclear reactor, the core comprising nuclear fuel assemblies, each assembly comprising nuclear fuel rods in which nuclear fuel is enclosed in a cladding, the method involving the periodic implementation, during the same operating cycle of the reactor, of the following steps of:

a) calculating, from measurements provided by sensors present in the reactor, the three-dimensional distribution of the local power in the core, b) simulating at least one accidental transient occurrence of power applied to the calculated three-dimensional distribution of local power, c) identifying, using thermomechanical calculations, at least one rod which is the most likely to be subject to a fracture of the cladding thereof during the simulated transient occurrence of power, and d) determining, using thermomechanical calculations on the rod identified, the value of the parameter which is representative of the operability of the reactor.

According to specific embodiments, the method may comprise one or more of the following features, taken in isolation or according to any technically possible combination:

step c) comprises a sub-step c1) of calculating the maximum value of a parameter which is representative of the stress state in the cladding (33) of each rod (24) during the simulated transient occurrence of power;

in the sub-step c1), the contact pressure between the pellets and the cladding of the rod in question is calculated by means of correlation or interpolation from values previously calculated;

steps a) to d) are carried out periodically with a time step of less than one month;

steps a) to d) are carried out with a time step of less than one week;

steps a) to d) are carried out with a time step of less than one day;

the nuclear reactor is a pressurised water nuclear reactor; and it comprises a step e) of using the determined value in order to command and/or control the operation of the nuclear reactor.

The invention further relates to a system for determining the value of a parameter representative of the operability, characterised in that it comprises means for implementing the steps of a method as defined above.

According to one variant, the system comprises at least one processor and storage means in which there is stored at least one program for carrying out steps of the determination method implemented by the system.

The invention further relates to a computer program which comprises instructions for implementing the steps of a method as defined above.

The invention further relates to a medium which can be used in a processor and on which a program as defined above is recorded.

BRIEF DESCRIPTION OF THE DRAWINGS

The invention will be better understood from a reading of the following description, given purely by way of example and with reference to the appended drawings, in which.

DETAILED DESCRIPTION

Figure 1:
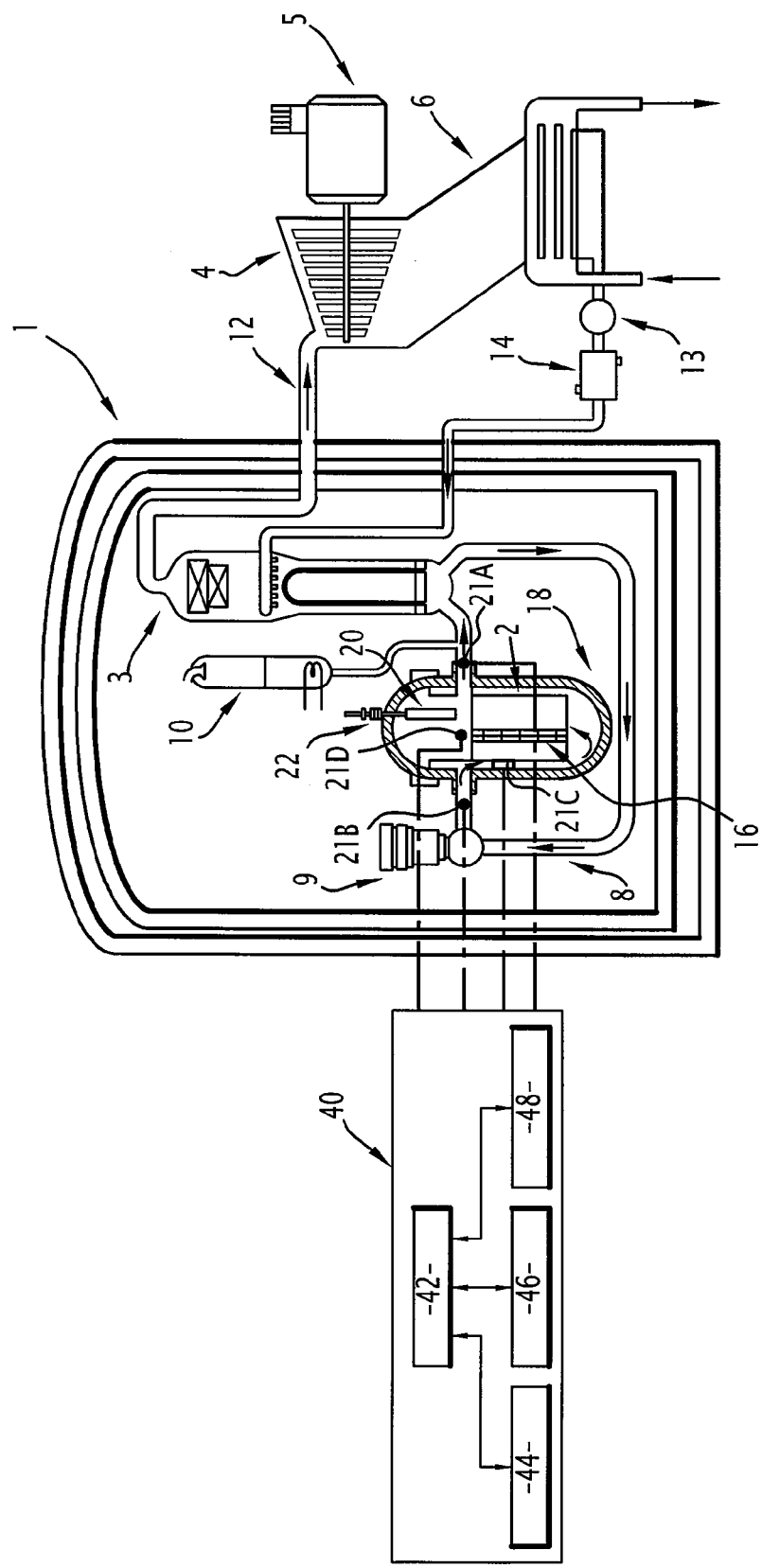
FIG. 1 is a schematic view of a pressurised water nuclear reactor.

FIG. 1 schematically illustrates a pressurised water nuclear reactor 1 which conventionally comprises:

a core 2, a steam generator 3, a turbine 4 which is coupled to an electrical energy generator 5, and a condensor 6.

The reactor 1 comprises a cooling system 8 which is provided with a pump 9 and in which the pressurised water flows along the path indicated by the arrows in FIG. 1. This water rises in particular through the core 2 in order to be reheated there, providing the cooling of the core 2.

The cooling system 8 further comprises a pressuriser 10 which allows the water flowing in the cooling system 8 to be pressurised.

The water of the cooling system 8 also supplies the steam generator 3 where it is cooled providing the evaporation of the water flowing in a secondary system 12.

The steam produced by the generator 3 is channelled by the secondary system 12 towards the turbine 4 then towards the condenser 6 where this steam is condensed by means of indirect heat exchange with cooling water flowing in the condenser 6.

The secondary system 12 comprises downstream of the condenser 6 a pump 13 and a reheating device 14.

Also in conventional manner, the core 2 comprises nuclear fuel assemblies 16 which are charged in a vessel 18. A single assembly 16 is illustrated in FIG. 1 but the core 2 comprises, for example, 157 assemblies 16.

The reactor 1 comprises control rod clusters 20 which are arranged in the vessel 18 above some of the assemblies 16. A single cluster 20 is illustrated in FIG. 1, but the core 2 may comprise, for example, approximately 60 clusters 20.

The clusters 20 may be moved by mechanisms 22 for being inserted into the fuel assemblies 16 over which they are arranged.

Conventionally, each control rod cluster 20 comprises rods which comprise one or more neutron-absorbing materials.

In this manner, the vertical movement of each cluster 20 allows the reactivity of the reactor 1 to be regulated and allows variations in the overall power P provided by the core 2 from zero power up to nominal power PN, in accordance with the introduction of the clusters 20 in the assemblies 16.

Some of these clusters 20 are intended to control the operation of the core 2, for example, in terms of power or temperature, and are referred to as control rod clusters. Others are intended only to shut down the reactor 1 and are referred to as shutdown clusters.

The clusters 20 are assembled in groups in accordance with their type and destination. For example, for reactors of the type 900 MWe, these groups are referred to as groups G1, G2, N1, N2, R, SA, SB, SC, SD . . . .

The reactor 1 also comprises a given number of sensors for measuring the effective values of operating parameters of the reactor, in particular a thermoelectric couple 21A for measuring the mean temperature of the water of the cooling system at the outlet of the vessel 18 and a thermoelectric couple 21B for measuring the mean temperature of the water of the cooling system at the inlet of the vessel 18.

Also in conventional manner, the nuclear reactor 1 comprises external chambers 21C for measuring the neutron flux, which chambers 21C are arranged around the vessel 18 of the core 2. The number and the positions of the chambers 21C, generally referred to as "ex-core chambers", vary in accordance with the model of the reactor 1.

Also in conventional manner, the reactor 1 comprises thermoelectric couples 21D which are arranged in the core 2 above assemblies 16 in order to measure the temperature of the water of the cooling system at the outlet of the assemblies 16. A single chamber 21C and a single sensor 21D have been illustrated in FIG. 1.

The ex-core chambers 21C and the thermoelectric couples 21D provide information relating to both the axial distribution, that is to say, vertically, and radial distribution of the local power in the core.

In order to calibrate the various sensors, and in particular the chambers 21C and the thermoelectric couples 21D, the reactor also comprises an item of equipment which is referred to as "in-core" (not illustrated) and which comprises movable probes which are fixed to the end of flexible cables in order to allow them to be inserted inside measurement tracks of some of the assemblies 16. These probes are introduced regularly into the core 2 in order to recalibrate the values measured by the various sensors relative to the measurements carried out by these probes, and thus to calibrate the various sensors of the reactor 1.

Figure 2:
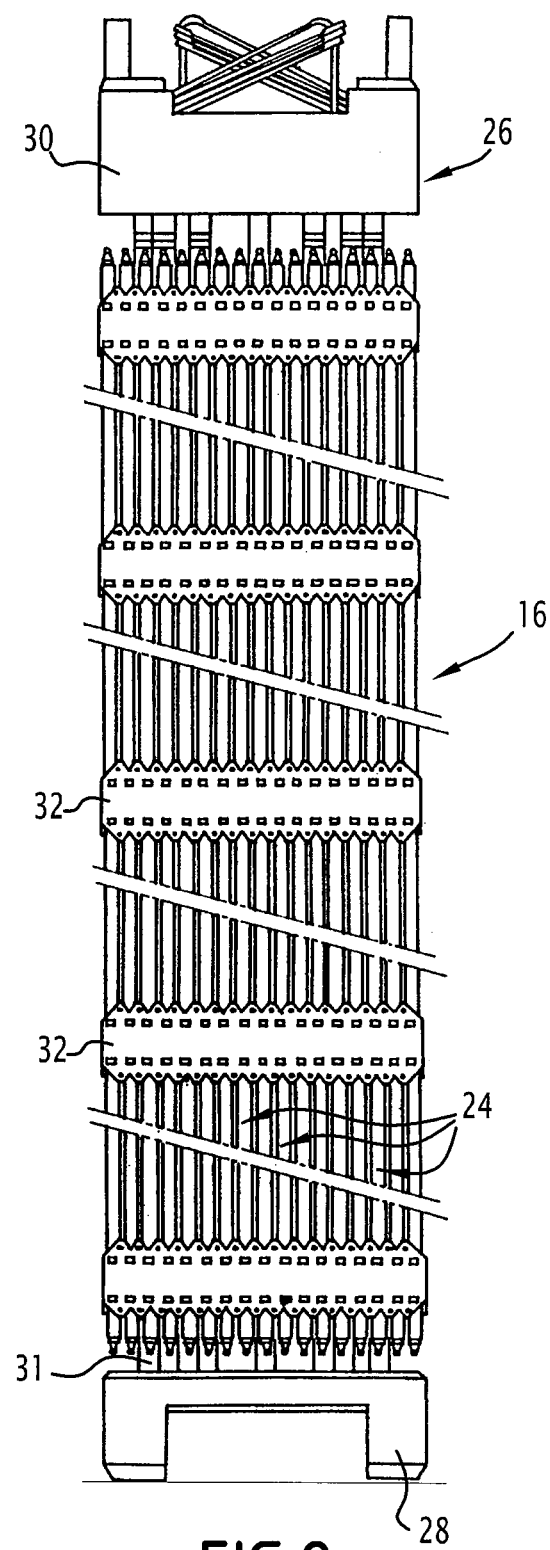
FIG. 2 is a schematic side view of a fuel assembly of the core of the reactor of FIG. 1.

As illustrated in FIG. 2, each assembly 16 conventionally comprises a grid of fuel rods 24 and a support skeleton 26 for the rods 24.

The skeleton 26 conventionally comprises a bottom nozzle 28, a top nozzle 30, guide tubes 31 which connect the two nozzles 30 and 28 and which are intended to receive rods of the control rod clusters 20 and spacer grids 32.

Figure 3:
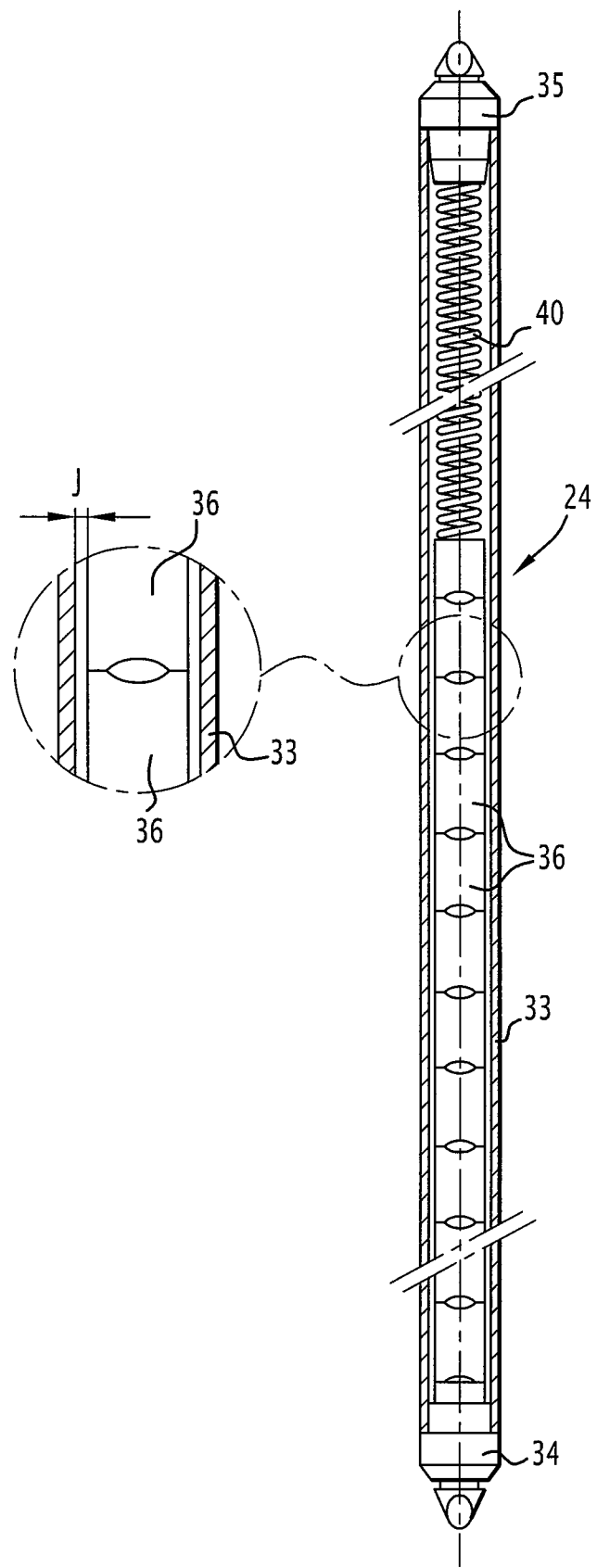
FIG. 3 is a schematic longitudinal section of a fuel rod of the assembly of FIG. 2.

As illustrated in FIG. 3, each fuel rod 24 conventionally comprises a cladding 33 in the form of a tube which is closed at the lower end thereof with a bottom end plug 34 and, at the upper end thereof, with an upper end plug 35. The rod 24 comprises a series of pellets 36 which are stacked in the cladding 33 and which are in abutment against the lower end plug 34. A retention spring 40 is arranged in the upper portion of the cladding 33 so as to be supported on the upper end plug 35 and on the upper pellet 36.

Conventionally, the pellets 36 are based on uranium oxide and the cladding 33 is of zirconium alloy.

In FIG. 3, which corresponds to a fuel rod 24 from production and before irradiation, there is a radial clearance J between the pellets 36 and the cladding 33. That is illustrated more specifically by the enlarged circled portion of FIG. 3.

This clearance J is what closes during processing and reprocessing of the fuel rod and opens when the fuel rod is deprocessed.

As illustrated in FIG. 1, the reactor 1 also comprises a data-processing system 40 for determining a parameter representative of the operability of the nuclear reactor 1. The system 40 is, for example, the one used more generally to command and control the operation of the nuclear reactor 1.

This system 40 comprises, for example, a data-processing unit 42 comprising one or more processor(s), data storage means 44, input/output means 46 and optionally display means 48. The storage means 44 which comprise, for example, one or more memories, store one or more computer program(s) in order to carry out the steps described below.

The system 40 is connected to the different sensors for measuring the operating parameters of the nuclear reactor 1, including sensors 21A to 21D.

In the example given below, the parameter for measuring the operability of the reactor 1 calculated by the system 40 is the parameter $\Delta$ defined by:

$$\Delta = (\sigma_\theta - \sigma_r)_{lim} - (\sigma_\theta - \sigma_r)_{sup}$$

where $\sigma_\theta$ is the circumferential and normal stress in a cladding 33;

$\sigma_r$ is the radial and normal stress in the same cladding 33;

$(\sigma_\theta - \sigma_r)_{sup}$ is i the greatest value reached by $(\sigma_\theta - \sigma_r)$ from the rods 24 of the core 2; and $(\sigma_\theta - \sigma_r)_{lim}$ is the limit value of $(\sigma_\theta - \sigma_r)$ beyond which a cladding 33 breaks.

This limit value has, for example, been determined as described in the document EP-1 556 870.

Figure 4:
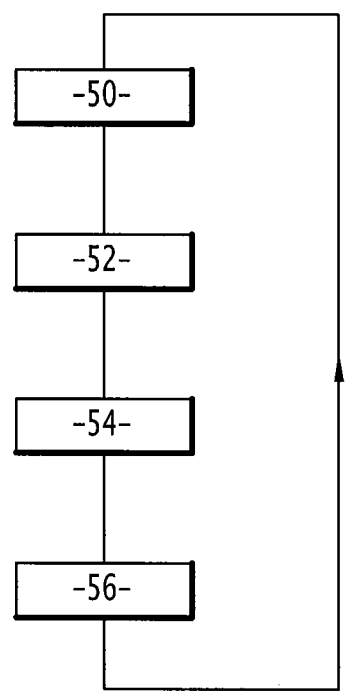
FIG. 4 is a flow chart illustrating successive steps of the method implemented in the reactor of FIG. 1.

The method used by the system 40 to determine the value of $\Delta$ will now be described with reference to the flow chart of FIG. 4.

This method involves the regular execution of the loop comprising steps 50, 52, 54 and 56 during an operating cycle of the nuclear reactor 1. The time step for carrying out this loop may be less than one month, one week, or even one day.

In a first step 50, the system 40 calculates the three-dimensional distribution of local power in the core 2 at the time step in question.

More precisely, a first rough calculation of the three-dimensional distribution of the local power in the core 2 is carried out by an item of neutron calculation software. The neutron calculation software used may be a conventional item of software, for example, the software SMART from the company AREVA NP (Registered Trade Mark).

This rough calculation is, for example, provided based on:
the charging characteristics of the core 2, that is to say, the arrangement and the characteristics of the assemblies 16 present in the core 2, characteristics stored, for example, in the storage means 44,
the mean thermal power of the core 2 established in conventional manner by the system 40, for example, using the measurements provided by the thermoelectric couples 21A and 21B, and
the mean temperature of the water at the inlet of the vessel 18 measured by the thermoelectric couple 21B,
the reference positions of the control rod clusters 20 stored in the storage means 44, and
the distribution of local power determined during the previous implementation of the loop of steps 50, 52, 54 and 56.

The results of this first rough calculation are then refined by adjusting the values calculated in this manner owing to the effective values measured by the chambers 21C and the thermoelectric couples 21D.

The use of such a rough calculation which is subsequently refined allows a good representation to be obtained of the three-dimensional distribution of the local power in the core 2, in a time which is compatible with the frequency of implementation of the method for determining the value of Δ.

Then, in step 52, the system 40 simulates transient occurrences of overall power, for example, using the above-mentioned neutron calculation software.

Preferably, the simulated transient occurrences are the accidental transient occurrences referred to as being of category 2 which bring about the most significant and rapid variations of power in the core 2.

These transient occurrences may be, for example:
the excessive increase in charge,
the uncontrolled retraction of groups of control rod clusters 20 when the reactor 1 is in a powered state,
the fall of cluster(s) 20.

The excessive increase of charge corresponds to a rapid increase of the flow rate of steam in the steam generator 3. Such an increase brings about an imbalance between the thermal power of the core 2 and the charge of the steam generator 3. This imbalance leads to a cooling of the cooling system 8. Owing to the moderating and/or the regulating effect of the mean temperature in the core 2 by the control rod clusters 20, the reactivity, and therefore the nuclear flux, increase in the core 2. In this manner, the overall power P provided by the core 2 increases rapidly.

In order to simulate this transient occurrence, it is considered that the flow rate of steam in the generator 3 increases from the initial value thereof up to the maximum value allowed by the characteristics of the secondary system 12. This increase is further sufficiently slow for the levels of power examined in order to prevent the automatic shutdown of the reactor owing to low pressure of the pressuriser 10.

The uncontrolled removal of groups of control rod clusters 20 when the reactor operates brings about an uncontrolled increase in the reactivity. There is consequently a rapid increase in the overall nuclear power P and the flux of heat in the core 2. Until a relief valve or a safety valve of the secondary system 12 is opened, the dissipation of heat in the steam generator 3 increases less quickly than the power released in the cooling system 8. There is consequently an increase of the temperature and pressure of water in the cooling system 8. In order to simulate this transient occurrence, a removal is assumed of the power groups at the maximum speed of 72 steps/min until complete removal.

If one or more of the control rod clusters 20 falls into the core, there is an immediate reduction of the reactivity and the overall power P in the core 2. Without protective action, the imbalance brought about in this manner between the cooling system 8 and the secondary system 12 brings about a reduction in the temperature of water entering the core 2, and an increase in the neutron power owing to the counter-reactions and the temperature control, until a new equilibrium is achieved between the cooling system 8 and the secondary system 12. The presence of the control rod cluster(s) 20 which have fallen brings about a deformation of the radial distribution of power, whilst the removal of the control group leads to an axial modification of the power.

Then, during step 54, the system 40 will determine the rods 24 which are subject to the most stress during the transient occurrences of power simulated during step 52.

This determination is carried out using an item of sorting software.

More precisely, during this step 54, the value will be calculated for a parameter which is representative of the state of stress in the cladding 33 of each rod 24, for example, the value of $(\sigma_\theta - \sigma_r)$.

In the example described, the parameter which is representative of the state of stress and the parameter which is representative of the operability of the reactor are based on the same difference of physical parameter $(\sigma_\theta - \sigma_r)$. However, this is not necessarily the case and the two parameters can be based on physical variables or functions of physical variables which are different but mutually coherent.

The calculation is carried out, for example, for each rod 24 by repeating, for the entire duration of the processing and/or deprocessing thereof and each simulated transient occurrence of power, the following loop comprising the sub-steps involving:
calculating the new dimensions of the cladding 33 and the pellets 36 of the rod 24 in accordance with the values of $(\sigma_\theta - \sigma_r)$ determined during the previous implementation of the loop,
calculating the number of moles of fission gas released during the new time step,
calculating the resultant increase of the pressure inside the cladding 33 during the new time step,
calculating the contact pressure between the pellets 36 and the cladding 33 resulting from the new dimensions and in particular the development of the linear power density and the combustion rate of the nuclear fuel in the rod 24 during the new time step, and
calculating the new value of $(\sigma_\theta - \sigma_r)$ in accordance with the new contact pressure value calculated, the new internal pressure value calculated and the new dimensions calculated.

The calculations relating to the number of moles of fission gas released, the internal pressure and the contact pressure are carried out not by means of explicit resolution of the corresponding equations, but instead by means of correlations.

More precisely, correlations are used to allow the values of the variables in question to be determined in accordance with the values of the same known variables for known conditions (linear power density, burnup . . . ). These known values originate, for example, from a database constructed from an item of thermomechanical calculation software.

This may be a conventional item of software, such as the software COPERNIC from the company AREVA NP (Registered Trade Mark).

The sorting software used for step 54 will preferably be a simplified version of the same item of thermomechanical calculation software.

The use of items of software based on the same models in order to implement steps 52 and 54 allows robustness and reliability to be ensured for the method for determining the value of the parameter representative of the operability of the nuclear reactor.

The use of correlations, rather than explicit calculations, allows the necessary calculations to be carried out in shorter periods of time which are compatible with the time step for implementing the method for determining the value of $\Delta$. In other variants, it is possible to use interpolations rather than correlations.

After carrying out the loop of step 54, there is known, for each transient occurrence of simulated power, a rough estimation of the maximum value $(\sigma_\theta - \sigma_r)_{max}$ of $(\sigma_\theta - \sigma_r)$ reached in each rod 24.

Based on these maximum values, the system 40 is able to identify the rods 24 which are subject to the most stress during transient occurrences of power.

Then, in step 56, the system 40 carries out complete thermomechanical calculations on the rods 24 which are subject to the most stress identified during step 54.

These calculations are carried out using an item of thermomechanical calculation software of conventional type, for example, the software COPERNIC from the company AREVA NP.

These complete thermomechanical calculations allow the value of $(\sigma_\theta - \sigma_r)_{sup}$ to be determined and thus allow the effective value of $\Delta$ to be determined. This effective value can be supplied in particular to an operator in charge of the reactor 1, for example, using the display means 48.

The operator is then in a position to know the extent to which he can operate the reactor in ERPO mode, or whether he must instead make it operate with nominal overall power PN.

In the same manner, the effective value of $\Delta$ calculated using the method described above may be used by the system 40 in order to initiate the automatic implementation of some operations within the reactor 1, for example, the sounding of an alarm, the shutdown of the reactor 1, the increase of the overall power.

The determined value of $\Delta$ is therefore used to command and/or control the operation of the reactor 1.

As indicated above, the steps 50, 52, 54 and 56 are repeated regularly during an operating cycle of the core, which allows the value of $\Delta$ to be updated.

This calculation of $\Delta$ which is almost in real time allows the careful considerations used up to the present time to be dispensed with for calculating the credit K and therefore allows gains to be made in terms of operability, whilst ensuring safe operation of the nuclear reactor.

Generally, the method described above can be used to calculate values of other parameters representative of the operability, other than $\Delta$.

Such a parameter can be based on the circumferential and normal stress $\sigma_\theta$ only or on a density of deformation energy. It may also be the credit K.

The above principles can be used for types of reactor other than pressurised water reactors, for example, for boiling water reactors.

In some variants, step 50 may use calculations other than those described above.

Also in some variants, a single transient occurrence of power is simulated during step 52. In the same manner, the transient occurrence(s) simulated may be transient occurrences of local or overall power.

Also in some variants, step 52 may involve loops which are different from those described. In the same manner, a correlation or interpolation may be used only to determine the contact pressure between the pellets 36 and the cladding 33 of a rod 24.

In still other variants, it is possible to identify during step 54 a single rod which is subject to the most stress, step 54 being implemented on this single rod.

What is claimed is:

1. A method of determining a value of an operability parameter representative of the operability of a nuclear reactor, the nuclear reactor having a reactor core comprising nuclear fuel assemblies, each fuel assembly comprising nuclear fuel rods in which nuclear fuel is enclosed in a cladding, the method comprising:
    periodically implementing, with a data processing system adapted to command and/or control an operation of the nuclear reactor, during a same operating cycle of the reactor, the following steps:
    a) calculating a three-dimensional distribution of local power in the reactor core from measurements provided by sensors present in the reactor,
    b) simulating at least one accidental transient occurrence of power applied to the calculated three-dimensional distribution of local power,
    c) identifying at least one rod most likely to be subject to a fracture of the cladding during the simulated accidental transient occurrence of power using thermomechanical calculations,
    d) determining the value of the operability parameter representative of the operability of the nuclear reactor using further thermomechanical calculations on the identified at least one rod, and
    e) at least one of commanding and controlling the reactor based on the determined value of the operability parameter,
    wherein the steps a) to d) are carried out periodically with a time step being less than one month.

2. The method according to claim 1, wherein the steps a) to d) are carried out with a time step being less than one week.

3. The method according to claim 2, wherein the steps a) to d) are carried out with a time step being less than one day.

* * * * *